United States Patent Office 3,035,094
Patented May 15, 1962

3,035,094
1-NITRO-3-(2,2,2-TRINITROETHYL) GUANIDINE AND METHOD OF PREPARATION
Howard A. Hageman, Englewood, N.J., assignor to United States Rubber Company, New York, N.Y., a corporation of New Jersey
No Drawing. Filed June 22, 1949, Ser. No. 100,751
4 Claims. (Cl. 260—564)

This invention relates to a new chemical which is the reaction product of trinitromethane and methylol nitroguanidine, 1-nitro-3-(2,2,2-trinitroethyl) guanidine and to a method of making the same.

Although nitro-aliphatic compounds have been proposed for the formulation of explosives, their number and types have been restricted by the lack of a simple method for introducing a multiplicity of nitro groups into the compound and by the frequent instability of the products.

I have now unexpectedly discovered that trinitromethane can be readily condensed with methylol nitroguanidine to yield a new chemical which is useful as an explosive, 1-nitro-3-(2,2,2-trinitroethyl) guanidine.

The equation for the reaction is as follows:

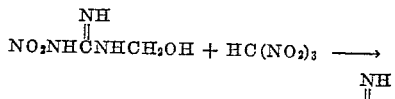

$$NO_2NH\overset{\overset{NH}{\|}}{C}NHCH_2OH + HC(NO_2)_3 \longrightarrow$$

$$NO_2NH\overset{\overset{NH}{\|}}{C}NHCH_2C(NO_2)_3 + H_2O$$

This reaction may conveniently be effected by refluxing a suspension of methylol nitroguanidine in a solution of trinitromethane in a suitable organic medium, preferably a lower alkanol, especially ethyl alcohol. After the reaction has proceeded to the desired extent, the product 1-nitro-3-(2,2,2-trinitroethyl) guanidine is recovered from the reaction mixture in any suitable manner.

Preferably, equimolecular proportions of methylol nitroguanidine and trinitromethane are employed in carrying out the reaction.

Methylol nitroguanidine, used as a reactant in the present invention, may conveniently be made by the condensation of formaldehyde with nitroguanidine.

The following example illustrates my invention in more detail.

EXAMPLE

Methylol Nitroguanidine

To a solution of 4.1 g. (0.05 mol) of 37% formalin and 0.1 g. NaHCO$_3$ in 45 ml. of water there is added 5.2 g. (0.05 mol) of nitroguanidine. The mixture is heated on a steam bath for 15 minutes. The hot solution is then filtered to remove undissolved matter. The filtrate is cooled to room temperature whereby there is obtained as a precipitate 4.8 g. (71% yield) of methylol guanidine, M.P. 216–7° C.

1-Nitro-3-(2,2,2-Trinitroethyl) Guanidine

To a suspension of 4.0 g. (0.03 mol) of the above methylol guanidine in 45 ml. of 95% C$_2$H$_5$OH there is added 4.5 g. (0.03 mol) of trinitromethane. The mixture is then heated at the refluxing temperature. A clear yellow solution results in 15 minutes. Heating under reflux is continued for 4 hours. The mixture is then cooled to room temperature. A white solid precipitates and is removed by filtration. The clear yellow filtrate is reduced to a volume of about 30 ml. by distillation under reduced pressure. It is then diluted with 40 ml. of water; this causes separation of solid. This solid is then redissolved by warming to 80° C. on the steam bath. Upon being cooled in an ice bath the solution deposits 2.8 g. of fine white needles, M.P. 165–7° C. (d.), of a product which is then recrystallized from 15 ml. of 95% ethanol to give 2.1 g. of product, M.P. 165–7° C. (d.).

|  | C | H | N |
|---|---|---|---|
| Calculated | 13.5 | 1.9 | 36.7 |
| Found | 13.3 | 1.7 | 37.3 |

Having thus described my invention, what I claim and desire to secure by Letters Patent is:

1. As a chemical compound, 1-nitro-3-(2,2,2-trinitroethyl) guanidine.

2. A method of making 1-nitro-3-(2,2,2-trinitroethyl) guanidine which comprises condensing trinitromethane with methylol nitroguanidine.

3. A process of making 1-nitro-3-(2,2,2-trinitroethyl) guanidine which comprises refluxing a suspension of methylol nitroguanidine in a solution of trinitromethane in a lower alkanol, and recovering 1-nitro-3-(2,2,2-trinitroethyl) guanidine from the resulting mixture.

4. A process of making 1-nitro-3-(2,2,2-trinitroethyl) guanidine which comprises refluxing a suspension of methylol nitroguanidine in a solution of trinitromethane in ethyl alcohol, and recovering 1-nitro-3-(2,2,2-trinitroethyl) guanidine from the resulting mixture.

No references cited.